United States Patent [19]

Moradi et al.

[11] Patent Number: 5,703,796
[45] Date of Patent: Dec. 30, 1997

[54] DRIVELINE ALIGNMENT APPARATUS AND METHOD

[75] Inventors: Mohammad A. Moradi, W. Bloomfield; Michael D. Rossman, Canton; Larry LaBell, Grosse Ile; Bonita Holz, Dearborn, all of Mich.

[73] Assignee: Ford Global Technologies, Inc., Dearborn, Mich.

[21] Appl. No.: 678,126

[22] Filed: Jul. 11, 1996

[51] Int. Cl.⁶ ........................................ B60K 17/00
[52] U.S. Cl. ........................ 364/563; 364/424.098; 180/381; 180/380; 180/377; 73/457; 73/458
[58] Field of Search .................. 364/563, 424.098; 180/248, 180, 377, 379, 381, 297, 233, 249, 380; 73/457, 458, 579, 593

[56] References Cited

U.S. PATENT DOCUMENTS

| | | | |
|---|---|---|---|
| 3,187,439 | 6/1965 | Leach . | |
| 4,392,694 | 7/1983 | Reynolds | 308/184 R |
| 4,518,855 | 5/1985 | Malak | 250/201 |
| 4,541,721 | 9/1985 | Dewar | 356/375 |
| 4,645,348 | 2/1987 | Dewar et al. | 356/376 |
| 4,647,208 | 3/1987 | Bieman | 256/375 |
| 4,653,346 | 3/1987 | Kato et al. | 74/701 |
| 4,745,469 | 5/1988 | Waldecker et al. | 358/93 |
| 4,841,460 | 6/1989 | Dewar et al. | 364/571.02 |
| 4,844,609 | 7/1989 | Floyd et al. | 356/154 |
| 4,862,598 | 9/1989 | Barlow et al. | 33/613 |
| 4,895,391 | 1/1990 | Groat | 280/779 |
| 4,899,218 | 2/1990 | Waldecker et al. | 358/93 |
| 4,966,251 | 10/1990 | Hirano | 180/338 |
| 4,984,173 | 1/1991 | Imam et al. | 364/508 |
| 5,006,721 | 4/1991 | Cameron et al. | 250/561 |
| 5,033,292 | 7/1991 | Dennis | 73/118.1 |
| 5,046,361 | 9/1991 | Sandstrom | 73/460 |
| 5,078,229 | 1/1992 | Kikuchi et al. | 180/248 |
| 5,145,025 | 9/1992 | Damian | 180/381 |
| 5,199,182 | 4/1993 | Fowler | 33/645 |
| 5,267,623 | 12/1993 | Kashiwagi | 180/58 |
| 5,431,049 | 7/1995 | Kopp | 73/457 |

Primary Examiner—James P. Trammell
Assistant Examiner—Bryan Bui
Attorney, Agent, or Firm—James J. Dottavio

[57] ABSTRACT

An apparatus and method for aligning a driveline in a motor vehicle, including supporting a transmission and a rear axle with the body of the motor vehicle. A driveshaft is supported at a first end with the transmission and supported at a second end with the rear axle. A center bearing is positioned to the body of the motor vehicle to further support the driveshaft. The position of the driveline is then measured and a shim thickness is calculated for installation between the center bearing and the body.

13 Claims, 1 Drawing Sheet

DRIVELINE ALIGNMENT APPARATUS AND METHOD

BACKGROUND OF THE INVENTION

1. Field of the Invention

This invention relates to an apparatus and method for aligning the driveline of a motor vehicle.

2. Prior Art

A rear wheel drive vehicle driveline typically includes a transmission having an output shaft connected through an elongate driveshaft to an axle assembly. The driveshaft typically comprises a pair of driveshafts which are connected with a universal joint therebetween. One of the driveshafts is supported by a center bearing secured to the underbody of the motor vehicle. Due to dimensional variations in the body build, the driveshaft is rarely aligned such that the axes of rotation are perfectly coaxial. Universal joints or flex couplings are provided at the transmission/driveshaft interface as well as at the driveshaft/rear axle interface. The joints accommodate variation in alignment therebetween. However, excessive misalignment causes objectionable NVH (noise, vibration and harshness) degradation in the motor vehicle during operation.

Prior efforts to correct driveline misalignment include completely assembling the motor vehicle and driving the vehicle to detect unacceptable levels of vibration during a road test. The source of the vibration in the assembled vehicle would be diagnosed and any detected misalignment of the driveline is corrected thereafter. However such methods are unreliable in discovering lesser misalignments and furthermore require excessive diagnostic disassembly and repair of the vehicle.

U.S. Pat. No. 4,844,609 to Floyd et al. and U.S. Pat. No. 5,033,292 to Dennis describe methods for detecting misalignment of drive shafts, but these techniques require mounting one or more devices to the driveline and taking measurements thereafter. These additional operations slow down the assembly process, require additional assembly and disassembly operations and introduce measurement error in the addition of the apparatus.

Therefore it would be desirable to provide a driveline alignment system which detects and corrects angular misalignment of the driveline during the installation process without requiring additional assembly operations to the driveline.

SUMMARY OF THE INVENTION

It is an object of the present invention to provide an apparatus and method to provide in-system misalignment detection and correction during assembly of the driveline to the motor vehicle not requiring additional assembly operations.

In realizing these objects, the apparatus and method of this invention include supporting a transmission and a rear axle with the body of the motor vehicle. A driveshaft is supported at a first end with the transmission and supported at a second end with the rear axle. A center bearing is positioned to the body of the motor vehicle to further support the driveshaft. The position of the driveline is then measured and a shim thickness is calculated for installation between the center bearing and the body.

DETAILED DESCRIPTION OF THE PREFERRED EMBODIMENTS

Figure 1:
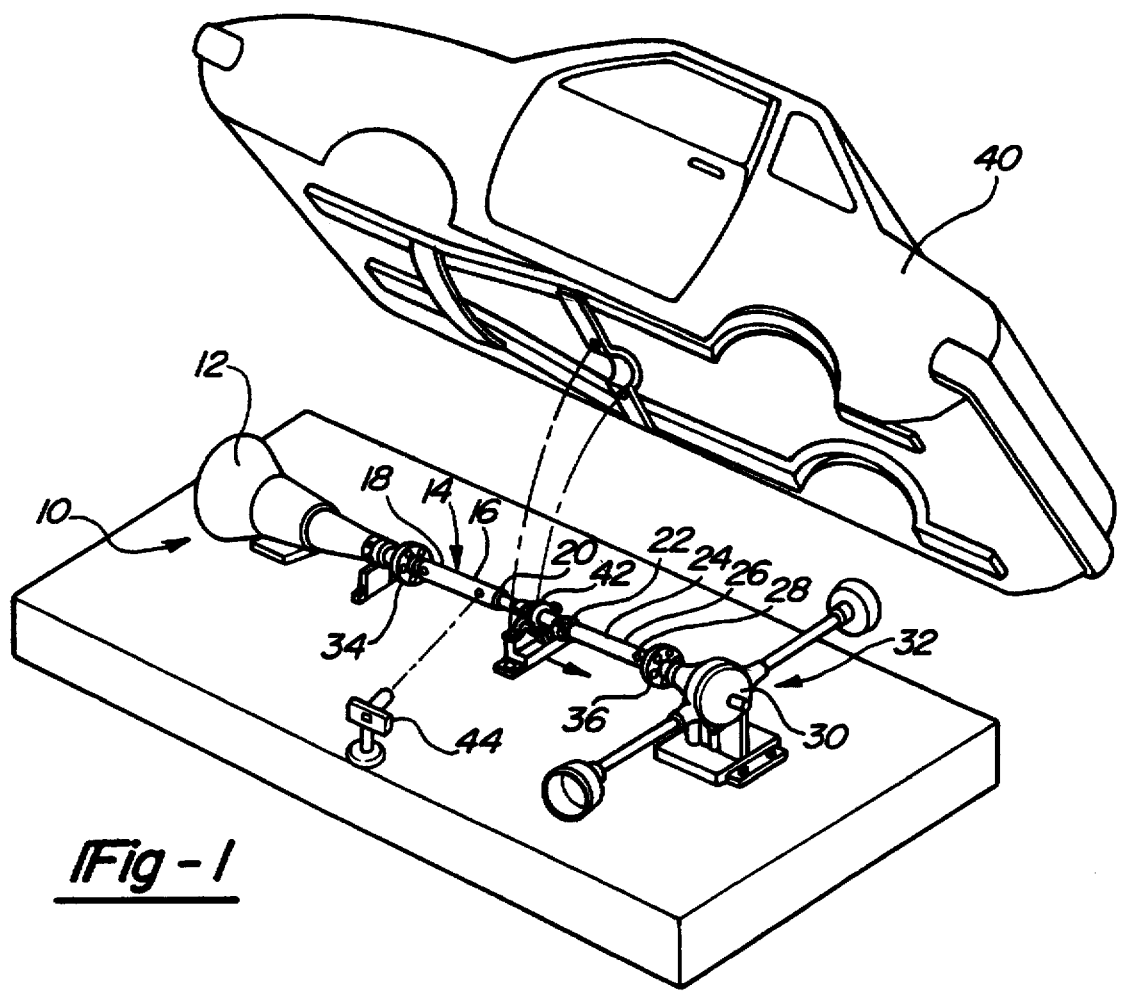
FIG. 1 is a side view of a driveline being installed into a motor vehicle of the prior art.

Referring to FIG. 1, a driveline assembly 10 includes a transmission 12 having a driveshaft assembly 14 drivably connected thereto. The driveshaft assembly 14 comprises a first elongate driveshaft 16 connected at a first end 18 to the transmission 12 and connected at a second end 20 through a universal joint 22 to the first end 24 of a second elongate driveshaft 26 which is then connected at a second end 28 to the differential assembly 30 of the rear axle 32. The driveshaft assembly 14 is connected to the transmission 12 and rear axle 32 through universal joints or flexible couplings 34, 36 at either end 18, 28 of the driveshaft 14. The transmission 12 and differential 30 are supported by the body 40 of the motor vehicle as is known in the art. A center bearing 42 is provided to rotatably support the driveshaft assembly 14 to the body 40.

Variations in the height of the mounting surfaces provided on the body 40 for securing the transmission, differential, or center bearing will produce a vertical angular misalignment of the driveshaft 14, resulting in driveline vibration. Furthermore, lateral variations may also create misalignment and thus result in driveline NVH problems. For the purposes of this disclosure, "vertical" refers to a displacement perpendicular the plane the vehicle rests upon and "lateral" refers to a displacement parallel the plane the vehicle rests upon in a direction perpendicular the longitudinal axis of the motor vehicle.

In the preferred embodiment, a body 40 is supported by a material handling conveyor (not shown), which includes a clamshell carrier supported by a power-and-free overhead conveyor as is well known in the art. The body 40 is positioned over a driveline conveyor (not shown) which transports a pallet 38 which supports and carries the driveline assembly 10. The driveline conveyor preferably includes a floor pallet 38 or an automated guided vehicle (not shown) to position the driveline 10 under the body 40. The driveline 10 is raised to the body 40 using hydraulic cylinders (not shown) provided on the driveline conveyor, or which lift the pallet 38 or driveline 10 from the conveyor.

The driveline 10 is preferably conveyed as an assembly, with the driveshaft 14 being secured at the front end 18 to the transmission 12, and at the rear end 28 to the rear axle 32. As the driveline 10 is raised to the body 40, the transmission 12 and axle 32 are secured to the body 40 in a conventional manner. The center bearing 42 is raised into position against the body 40, but preferably not secured.

After the driveline 10 is positioned to the body 40 as described above, the vertical locations of the transmission 12, differential 30, and driveshaft assembly 14 are measured. In an alternate embodiment, the position of these components in the lateral and longitudinal axes are measured as well.

Alternatively, the body 40 may be lowered from the body conveyor onto a fixture (not shown) which locates the body 40 using pins provided on the fixture which engage master control holes (not shown) provided in the body 40 for precisely fixturing the body 40 as is known in the art. The driveline 10 is then positioned to the body 40 as described above and measurements are taken and the driveline shimmed as described above.

The above-described measurements are taken preferably using non-contact methods. A preferred measurement method includes a camera measurement system provided by Perceptron, Inc. of Farmington, Mich. In a preferred system, a Perceptron P1000 system is used, including ten Perceptron 911-0011 Tricam Contour Sensing cameras 44, which are directed at the transmission 12, differential 36, and driveshaft assembly 14 after the driveline is positioned to the body 40 as described above. The cameras 44 measure the position of the driveline assembly 10. A computer calculates the alignment of the driveline 10 and an optimal adjustment at the center bearing 42.

The cameras 44 focus on several points of the driveline 10, including the centerline of the front and rear driveshafts near each end 18, 20, 24, 26 of each driveshaft 16, 26. The cameras 44 scan the surface of the driveshafts 16, 26 and determine a center of the arc to calculate the centerline of the driveshafts 16, 26 at those points. Other cameras 44 measure points on the transmission case 12 and differential case 30. The points on the transmission and differential 12, 30 preferably include flanges, ribs, or scribe lines (not shown) cast or machined into the transmission and differential housings.

Alternative methods (not shown) could be used to determine the position of the driveline, such as using a coordinate measuring machine (CMM), or any other device known in the art for measuring such assembled components.

Figure 2:
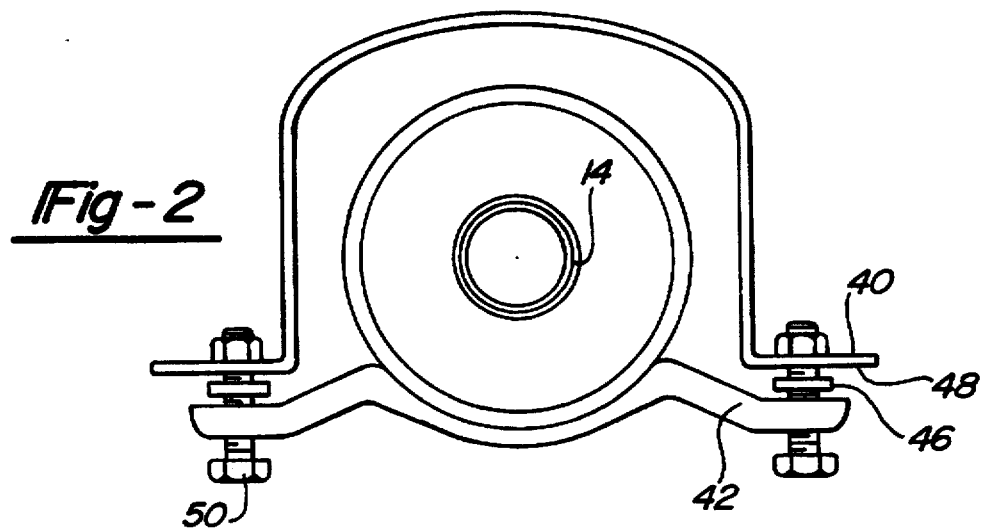
FIG. 2 is a front view of a center bearing assembly being installed into a motor vehicle according to the present invention.

Once the measurements are taken, a computer (not shown) is used to calculate vertical misalignment of the driveline 10 and calculates a correction at the center bearing 42 location. The computer calculates the amount of distance the center bearing 42 needs to be displaced vertically to provide for optimal alignment of the driveshaft 14 in that particular body 40. A display (not shown) indicates to the operator the thickness of a shim 46 which is to be positioned between the center bearing 42 and the bearing mounting surface 48 on the motor vehicle body 40, as shown in FIG. 2, to provide for optimal vertical alignment of the driveshaft 14. The display may also provide a lateral and longitudinal displacement which the center bearing 42 should be moved to provide optimal positioning and lateral alignment of the driveline 10. The operator then installs the necessary shim(s) 44 and positions the center bearing 42 accordingly prior to securing the center bearing 42 to the body 40 using bolts 50 as are known in the art.

A nominal shim 46 is specified for the center bearing 42 attachment between the center bearing 42 and the body 40, thereby permitting adjustment either above or below a nominal position. In the preferred embodiment, a seven millimeter nominal vertical shim 44 is provided to accommodate body 40 build variation and driveline 10 variation.

Once the center bearing 42 is secured as described above, a second measurement is preferably taken to ensure proper driveline 10 alignment. If desired a second correction may be given to the operator to reposition the center bearing 42 vertically and/or laterally. However preferably a second correction is not required to produce an acceptable alignment.

In the preferred embodiment, longitudinal and lateral displacement of the driveline 10 is controlled through body 40 dimensional control and manufacturing locators as are well known in the art. One of the attachments for the center bearing is preferably a sized hole through the center bearing 42 bracket which locates the bearing longitudinally as well as laterally to the body 40. The second attachment is an oversized hole or slot to accommodate any variation in the body 40 and center bearing 42. The vertical displacement of the center bearing 42 is measured and shimmed as described above to provide optimal alignment of the driveshaft 14. Furthermore, upon collection of data over time, a trend may be established and the driveline 10 shimmed as appropriate for a given trend if it is determined that a particular body build and driveline 10 combination require a consistent shim 46 thickness to produce an acceptable driveline 10. Thus the frequency of the measurements may then be reduced over time while the body and driveline are measured independently and the appropriate shims are installed.

In an alternate embodiment, the front of the front driveshaft 18, rear of the front driveshaft 20, front of the rear driveshaft 24, and rear of the rear driveshaft 28 are measured as described above preferably using non contact measurement. The driveshaft 14 is then aligned at the center bearing 42 using the measurements at the front and rear of the driveshafts using the method described above. This alternate embodiment only corrects for misalignment of the driveshaft and does not account for misposition of the rest of the driveline 10.

In a further alternative embodiment, the driveline 10 is positioned to the body 40 of the motor vehicle, but the rear axle 32 and center bearing 42 are not secured. The alignment of the driveline 10 is measured as described above and calculations are made to provide shims 46 between the axle 32 and the body 40 and a shim 46 between the center bearing 42 and the body 40, similar to the calculations described above for the center bearing 42 alone. The shims 46 are installed and the driveline 10 secured as described above. Furthermore, calculations may be made to provide lateral or axial adjustments of the axle 32 and center bearing 42 to more precisely position the driveline 10 to the body 40 prior to securing the driveline 10.

Although the preferred embodiments of the present invention have been disclosed, various changes in modifications may be made without departing from the scope of the invention as set forth in the appended claims.

What is claimed is:

1. A method for aligning a driveline in a motor vehicle having a body, comprising the steps of:
    and supporting a transmission and a rear axle with the body of the motor vehicle;
    supporting a driveshaft at a first end with the transmission and supporting the driveshaft at a second end with the rear axle;
    positioning a driveshaft center bearing to the body of the motor vehicle and further supporting the driveshaft with the center bearing;
    measuring the position of the driveline before the center bearing is secured to the body; and
    calculating a shim thickness to install between the center bearing and the body.

2. The method of aligning a driveline according to claim 1, wherein measuring the position of the driveline comprises measuring the vertical location of the driveshaft at the front, center, and rear of the driveshaft.

3. The method of aligning a driveline according to claim 2, wherein the axle includes a differential and measuring the position of the driveline further comprises measuring the vertical location of the transmission and differential.

4. A method for aligning a driveline in a motor vehicle according to claim 2, wherein the measurements are used to calculate the thickness of a shim between the center bearing and the body for aligning the driveline.

5. A method for aligning a driveline of a motor vehicle according to claim 4, further comprising measuring the lateral position of the driveshaft at the front, center, and rear of the driveshaft.

6. A method of aligning a driveline of a motor vehicle according to claim 5, wherein the center bearing is moved laterally to align the center of the driveshaft with the front and rear ends.

7. A method for aligning a driveline of a motor vehicle according to claim 6, further comprising measuring the longitudinal position of the driveshaft, transmission and differential.

8. A method for aligning the driveline of a motor vehicle according to claim 4, wherein Perceptron P1000 system is used to determine the shim thickness.

9. A method for aligning the driveline of a motor vehicle according to claim 1, wherein the driveline position is measured using non-contact techniques.

10. A method for aligning the driveline of a motor vehicle according to claim 9, wherein the driveline is measured using Perceptron cameras.

11. A method for aligning the driveline of a motor vehicle according to claim 1, wherein a coordinate measuring machine is used to measure the driveline position.

12. An apparatus for measuring the alignment of a driveline of a motor vehicle having a body, comprising:

means for supporting the body of a motor vehicle having a driveline including a transmission, driveshaft and rear axle attached thereto;

means for supporting a driveshaft at a first end with the transmission and supporting the driveshaft at a second end with the rear axle;

means for positioning a driveshaft center bearing to the body of the motor vehicle and further supporting the driveshaft with the center bearing;

means for measuring the position of the driveline comprising a Perceptron camera; and means for calculating a shim thickness to install between the center bearing and the body.

13. An apparatus for measuring the alignment of a driveline of a motor vehicle according to claim 12, wherein the means for calculating the shim thickness comprises a Perceptron P1000 system.

* * * * *